United States Patent
Di Sarro et al.

(10) Patent No.: US 9,413,169 B2
(45) Date of Patent: Aug. 9, 2016

(54) ELECTROSTATIC DISCHARGE PROTECTION CIRCUIT WITH A FAIL-SAFE MECHANISM

(71) Applicant: GLOBALFOUNDRIES INC., Grand Cayman (KY)

(72) Inventors: James P. Di Sarro, Plano, TX (US); Robert J. Gauthier, Jr., Hinesburg, VT (US); Tom C. Lee, Essex Junction, VT (US); Junjun Li, Williston, VT (US); Souvick Mitra, Essex Junction, VT (US); Christopher S. Putnam, Hinesburg, VT (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 218 days.

(21) Appl. No.: 14/243,295

(22) Filed: Apr. 2, 2014

(65) Prior Publication Data
US 2015/0288174 A1    Oct. 8, 2015

(51) Int. Cl.
*H02H 9/04*    (2006.01)
(52) U.S. Cl.
CPC ............... *H02H 9/046* (2013.01); *H02H 9/042* (2013.01)
(58) Field of Classification Search
CPC ............................. H02H 9/046; H02H 9/042
USPC ............................................................ 361/56
See application file for complete search history.

(56) References Cited

U.S. PATENT DOCUMENTS

| | | |
|---|---|---|
| 6,690,555 B1 | 2/2004 | Pasqualini |
| 6,917,207 B1 | 7/2005 | Blumenthal |
| 7,085,113 B2 | 8/2006 | Gauthier, Jr. et al. |
| 7,639,462 B2 | 12/2009 | Graebel et al. |
| 7,724,485 B2 | 5/2010 | Worley et al. |
| 7,817,390 B2 | 10/2010 | Ker et al. |
| 7,881,028 B2 | 2/2011 | Abou-Khalil et al. |
| 7,884,617 B2 | 2/2011 | Ker et al. |
| 8,576,526 B2 * | 11/2013 | Chu ........................ H02H 9/046 361/56 |

(Continued)

FOREIGN PATENT DOCUMENTS

| | | |
|---|---|---|
| WO | 2012051443 A2 | 4/2012 |
| WO | 2012103552 A2 | 8/2012 |

OTHER PUBLICATIONS

Y. Cheng Cheng & M. D. Ker The Effect of IEC-Like Fast Transients on RC-Triggered ESD Power Clamps, IEEE Transactions on Electron Devices, 2009, 56(6).

(Continued)

*Primary Examiner* — Scott Bauer
(74) *Attorney, Agent, or Firm* — Thompson Hine LLP; Anthony Canale

(57) ABSTRACT

Circuits and methods for providing electrostatic discharge protection. The protection circuit may include a power clamp device, a timing circuit including a resistor and a capacitor that is coupled with the resistor at a node, a transmission gate configured to selectively connect the node of the timing circuit with the power clamp device, and a control circuit coupled with the node. The control circuit is configured to control the transmission gate based upon whether or not the capacitor is defective. The timing circuit may be deactivated if the capacitor in the timing circuit is defective and the associated chip is powered. Alternatively, the timing circuit may be activated if the capacitor in the timing circuit is not defective.

20 Claims, 3 Drawing Sheets

(56) References Cited

U.S. PATENT DOCUMENTS

| | | | |
|---|---|---|---|
| 2010/0290165 A1* | 11/2010 | Hartberger | H01L 27/0285 361/56 |
| 2013/0025814 A1 | 1/2013 | Demetriou et al. | |
| 2013/0069131 A1 | 3/2013 | Kerber et al. | |
| 2013/0163131 A1 | 6/2013 | Gist, III et al. | |
| 2013/0286519 A1 | 10/2013 | Peachey et al. | |
| 2014/0265632 A1* | 9/2014 | Wang | H02H 7/16 307/116 |

OTHER PUBLICATIONS

Y. Cao & U. Glaser. Novel Active ESD Clamps for High-Voltage Applications, IEEE Transactions on Device and Materials Reliability, 2013, 13(2).

* cited by examiner

ELECTROSTATIC DISCHARGE PROTECTION CIRCUIT WITH A FAIL-SAFE MECHANISM

BACKGROUND

The invention generally relates to semiconductor manufacturing and integrated circuits and, more particularly, to circuits and methods for providing electrostatic discharge protection.

An integrated circuit may be exposed to electrostatic discharge (ESD) events that can direct potentially large and damaging ESD currents to the integrated circuits of the chip. An ESD event involves an electrical discharge from a source, such as the human body or a metallic object, over a short duration and can deliver a large amount of current to the integrated circuit. Precautions may be taken to protect an integrated circuit from ESD events. One such precaution is to incorporate an ESD protection circuit into the chip. If an ESD event occurs, the ESD protection circuit triggers an ESD protection device, such as a silicon-controlled rectifier, to enter a low-impedance, conductive state that directs the ESD current to ground and away from the integrated circuit on the chip. The ESD protection device clamps the ESD protection device in its conductive state until the ESD current is drained and the ESD voltage is discharged to an acceptable level.

Circuits and methods are needed to provide improved electrostatic discharge protection.

SUMMARY

In an embodiment of the invention, a protection circuit includes a power clamp device, a timing circuit including a resistor and a capacitor that is coupled with the resistor at a node, a transmission gate configured to selectively connect the node of the timing circuit with the power clamp device, and a control circuit coupled with the node. The control circuit is configured to control the transmission gate based at least in part upon whether or not the capacitor is defective.

In another embodiment of the invention, a method is provided for operating a protection circuit that includes a timing circuit. The method includes powering a chip associated with the protection circuit and, when the chip is powered, detecting whether a capacitor of the timing circuit is defective. In response to the capacitor being defective, the timing circuit is deactivated.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
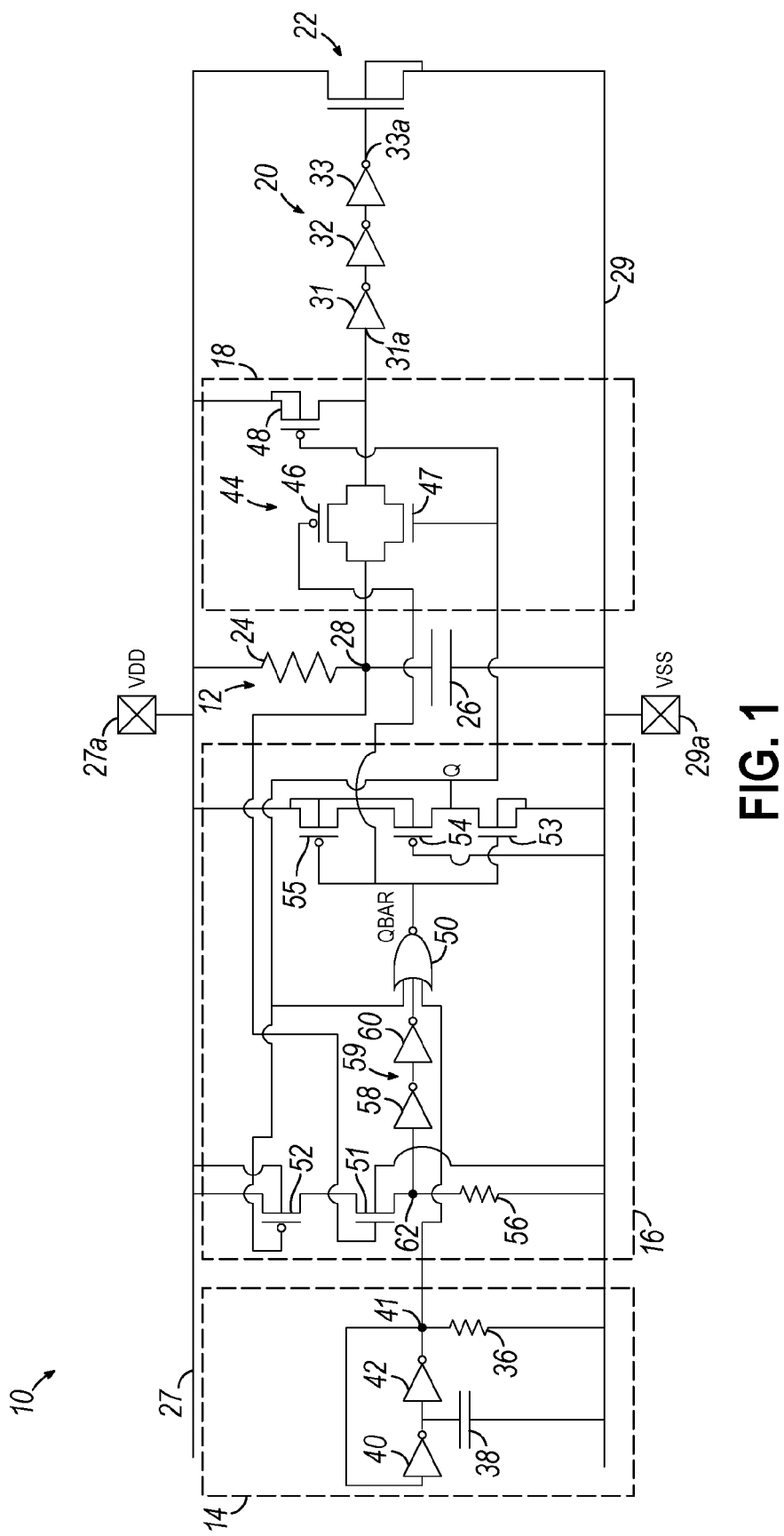
FIG. 1 is a circuit diagram in accordance with an embodiment of the invention.
Figure 2:
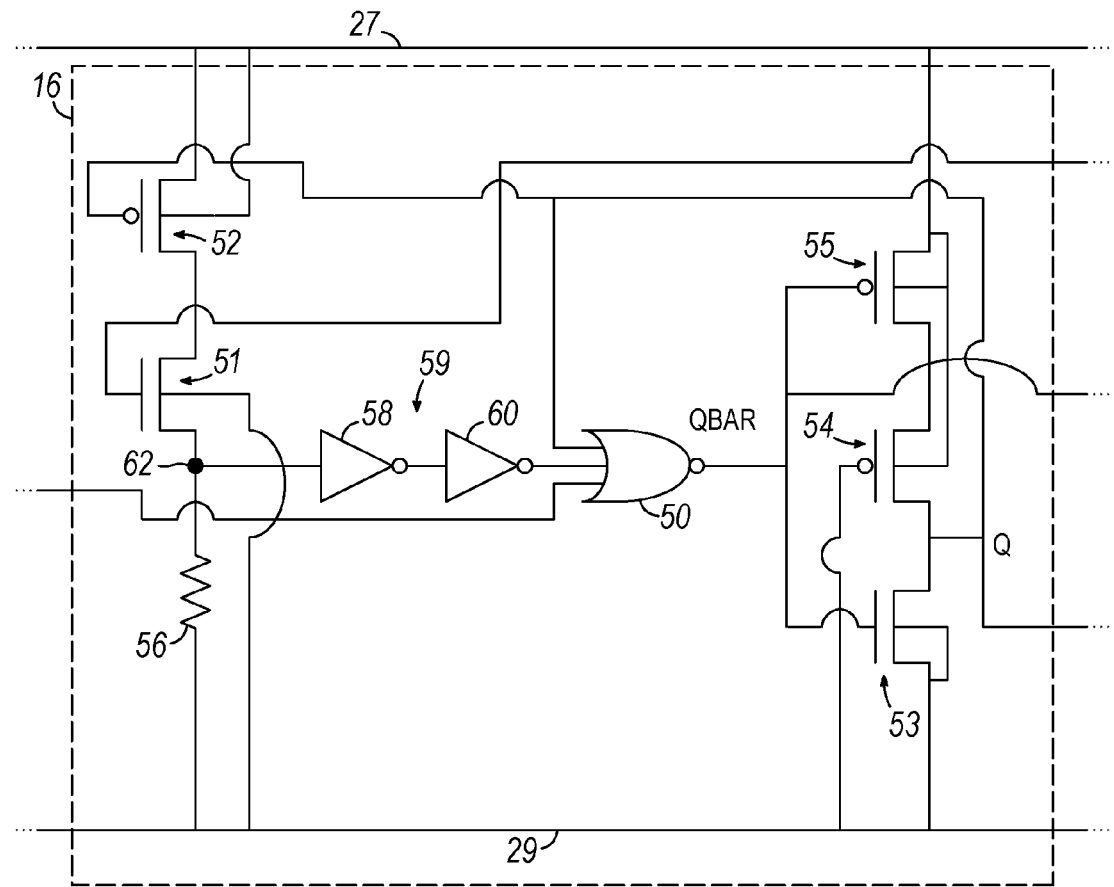
FIG. 2 is an enlarged view of a portion of the circuit diagram of FIG. 1.
Figure 3:
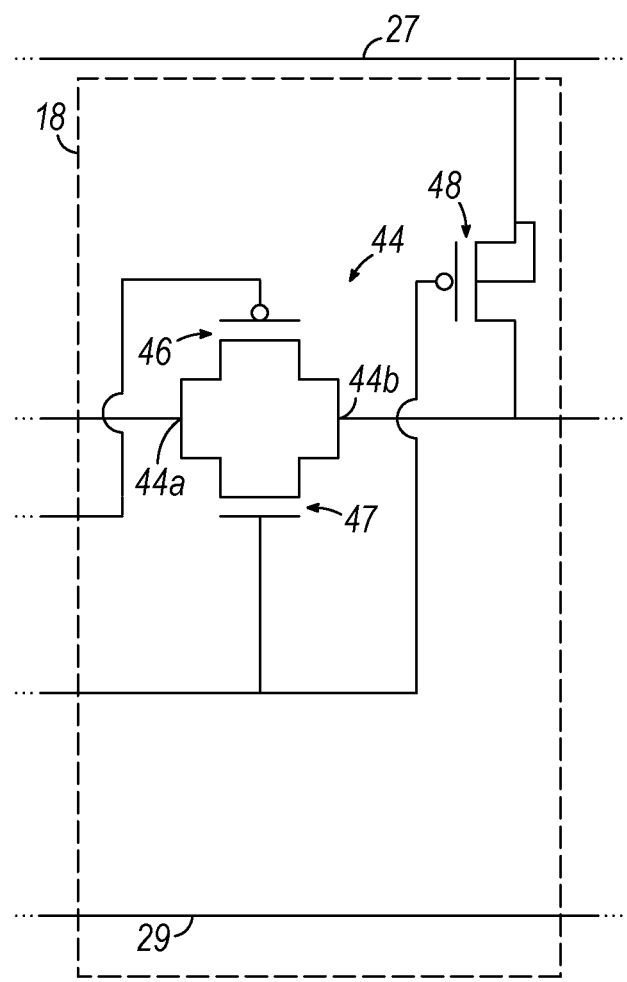
FIG. 3 is an enlarged view of another portion of the circuit diagram of FIG. 1.

With reference to FIGS. 1-3 and in accordance with an embodiment of the invention, an electrostatic discharge (ESD) protection circuit 10 for a chip generally includes a filter or timing circuit 12, an ESD detection circuit 14, a transmission gate circuit 18, a control circuit 16 for the transmission gate circuit 18, a driving circuit in the representative form of an inverter chain 20, and a power clamp device 22 coupled by the inverter chain 20 and transmission gate circuit 18 with the timing circuit 12.

In a representative embodiment, the power clamp device 22 may be a dimensionally-large metal-oxide-semiconductor device (e.g., a bigFET) that may also be characterized by a thick gate dielectric (e.g., oxide) layer and, in one embodiment, may be further constituted by an NFET. Because of its large size, the bigFET is capable of conducting a large current from its source to its drain. In the ESD protection circuit 10, the current capacity of the bigFET is sufficient to dissipate the large current produced by an ESD event. The current capacity is enabled by the device geometry. For example, the bigFET may have a total width equal to several thousand microns and multiple emitter fingers distributed across the total width. Alternatively, the power clamp device 22 may be a different type of electronic device, such as a silicon controlled rectifier.

The timing circuit 12 includes a resistor 24 and a capacitor 26 that is coupled in series with the resistor 24 at a node 28. The timing circuit 12 is coupled between a positive power supply ($V_{DD}$) rail 27 and a negative power supply ($V_{SS}$) rail 29. Specifically, the resistor 24 is coupled with the $V_{DD}$ rail 27 and the capacitor 26 is coupled with the $V_{SS}$ rail 29. The $V_{DD}$ rail 27 is connected with a $V_{DD}$ power pin 27a and the $V_{SS}$ rail 29 is connected with a $V_{SS}$ power pin 29a.

The capacitor 26 may be comprised of, for example, a deep trench decoupling capacitor that includes an array of small deep trenches constructed into a silicon substrate of the chip. The capacitor plates and inter-plate dielectric layer may be formed using the array of small deep trenches. Deep trench decoupling capacitors are compact structures relative to other types of capacitor structures used in ESD protection timing circuits. Constructing the capacitor 26 as a deep trench decoupling capacitor may significantly reduce the layout area of the timing circuit 12 in comparison with other types of capacitor structures used in timing circuits.

The inverter chain 20 includes multiple serially-connected inverters 31, 32, 33 in which the inverter 33 has an output 33a that is coupled with a gate of the power clamp device 22 and inverter 31 has an input 31a that is coupled by the transmission gate circuit 18 with the node 28 between the resistor 24 and capacitor 26. Each of the inverters 31, 32, 33 in the inverter chain 20 includes a PFET and an NFET coupled in series with the PFET, and the inverter chain 20 may include a different number of individual inverters.

During an ESD event that applies an ESD potential between the $V_{DD}$ rail 27 and the $V_{SS}$ rail 29, the timing circuit 12 causes the inverter chain 20 to bias the gate of the power clamp device 22 with a voltage sufficient to switch on the power clamp device 22. The power clamp device 22 is thereby opened so as to provide a current path for a duration sufficient to discharge the ESD current, thereby clamping the $V_{DD}$ rail 27 to the $V_{SS}$ rail 29 (i.e., to ground).

The ESD detection circuit 14, control circuit 16, and transmission gate circuit 18 serve various roles in the operation of the ESD protection circuit 10 so that, if the capacitor 26 is defective, the chip remains functional. If the capacitor 26 is defective, the timing circuit 12 is deactivated by the joint action of the ESD detection circuit 14, control circuit 16, and transmission gate circuit 18. If the capacitor 26 is not defective, the timing circuit 12 is activated by the joint action of the ESD detection circuit 14, control circuit 16, and transmission gate circuit 18.

The ESD detection circuit 14 is coupled with the control circuit 16 and is configured to sense occurrence of an electrostatic discharge event. The ESD detection circuit 14 may include a resistor 36, a capacitor 38, and a driving circuit in the representative form of multiple serially-connected inverters 40, 42 that are coupled with the resistor 36 and capacitor 38. The resistor 36 couples the output of inverter 42 with the $V_{SS}$ rail 29. The voltage at a node 41 between the resistor 36 and the output of inverter 42 is fed back to an input of the inverter 40. The capacitor 38 couples the output of inverter 40 with the $V_{SS}$ rail 29. The ESD detection circuit 14 latches when the chip is not powered and the slew rate at the $V_{DD}$ rail 27 exceeds a given value that reflects the occurrence of an ESD event. When latched, the ESD detection circuit 14 communicates a voltage level equal to logic 1 (high or $V_{DD}$) to the control circuit 16.

The transmission gate circuit 18 is configured to control the ability of the timing circuit 12 to trigger the power clamp device 22. The transmission gate circuit 18 includes a pull-up field effect transistor 48 and a transmission gate 44 comprised of field effect transistors 46, 47. The field effect transistor 47 may be an n-channel field effect transistor (NFET) and the field effect transistors 46, 48 may be p-channel field effect transistors (PFET). In the transmission gate 44, the sources of the field effect transistors 46, 47 are connected in parallel, and the drains of the field effect transistors 46, 47 are connected in parallel.

The transmission gate 44 is configured to selectively block or pass a signal from its input 44a to its output 44b. The input 44a of the transmission gate 44 is coupled with the node 28 between the resistor 24 and capacitor 26. The output 44b of the transmission gate 44 is coupled with the inverter chain 20. The control gates of the constituent field effect transistors 46, 47 of transmission gate 44 are biased in a complementary manner by the control circuit 16 so that both field effect transistors 46, 47 are either turned on or turned off When a voltage level (i.e., an analog voltage of $V_{DD}$) corresponding to a logic 1 (i.e., a binary high value) is applied to the gate of field effect transistor 46 and a voltage level (i.e., an analog voltage of $V_{SS}$) corresponding to logic 0 (i.e., a binary low value) is applied to the gate of the field effect transistor 47, and both field effect transistors 46, 47 are turned off. This generates a high impedance between the input 44a and output 44b of the transmission gate 44 that blocks signal transmission and effectively isolates the timing circuit 12 from the power clamp device 22.

When an analog voltage level corresponding to logic 0 is applied to the gate of field effect transistor 46 and an analog voltage level corresponding to the complementary logic 1 is applied to the gate of field effect transistor 47, both field effect transistors 46, 47 are turned on and conduct such that the input 44a of the transmission gate 44 is coupled with output 44b of the transmission gate 44. In its conducting state, a voltage at the node 28 between the resistor 24 and capacitor 26 is passed from the input 44a of the transmission gate 44 to the output 44b of the transmission gate 44.

The field effect transistor 48 is coupled between the $V_{DD}$ rail 27 and the input 31a to the inverter 31 of the inverter chain 20. As described hereinafter, the field effect transistor 48 may be turned on to supply an analog voltage level to the inverter chain 20, if the capacitor 26 is defective and the timing circuit 12 is deactivated by the control circuit 16, that turns off the power clamp device 22 to isolate the $V_{DD}$ rail 27 from the $V_{SS}$ rail 29 and to disable the ability of the ESD protection circuit 10 to respond to an ESD event.

The control circuit 16 includes a three-input NOR gate 50, multiple field effect transistors 51, 52, 53, 54, 55, a resistor 56, and a driving circuit in the representative form of an inverter chain 59 that includes a chain of serially-connected inverters 58, 60. The field effect transistors 52, 54, 55 may be p-channel field effect transistors (PFETs) and the field effect transistors 51, 53 may be n-channel field effect transistors (NFETs).

The NOR gate 50 is a digital logic gate that implements a logical NOR truth table to output a logic signal Qbar. The voltage level for a logic signal Qbar output by the NOR gate 50 is equal to logic 1 (i.e., high or $V_{DD}$) only if all of the inputs to the NOR gate 50 are logic 0 (i.e., low or $V_{SS}$). If any of the inputs to the NOR gate 50 is equal to logic 1, the voltage level for the logic signal Qbar output by the NOR gate 50 is equal to logic 0. The inputs to the NOR gate 50 are coupled, respectively, with an output of the ESD detection circuit 14, the field effect transistor 51 through the inverter chain 59, and a line carrying a voltage level for a logic signal Q that is output by the field effect transistors 53, 54, 55.

If not switched off by the control circuit 16, the transmission gate 44 of the transmission gate circuit 18 is conducting and transfers a voltage from the timing circuit 12 to the input 31a of the inverter 31 of inverter chain 20. If the transmission gate 44 of the transmission gate circuit 18 is switched off by the control circuit 16 because the capacitor 26 is defective (e.g., shorted), the transmission gate circuit 18 deactivates the timing circuit 12 by cutting off (i.e., isolating) the timing circuit 12 from the inverter chain 20. The transmission gate circuit 18 contemporaneously causes the field effect transistor 48 to pull up the input of the inverter chain 20 to the voltage of the $V_{DD}$ rail 27 (i.e., logic 1), which in turn drives the gate of the power clamp device 22 to logic 0 (i.e., low) and turns off the power clamp device 22.

The source and body of the field effect transistor 52 are coupled with the $V_{DD}$ rail 27. The drain of the field effect transistor 52 is coupled with the drain of field effect transistor 51. The gate of the field effect transistor 51 is coupled with the node 28 between the resistor 24 and capacitor 26, and receives feedback from the node 28. The body of the field effect transistor 51 is coupled with the $V_{SS}$ rail 29, and the source of field effect transistor 51 is coupled with the $V_{SS}$ rail 29 in series with a resistor 56 at a node 62. The node 62 is coupled with one of the inputs of the NOR gate 50 by the inverter chain 59.

The output of the NOR gate 50 is coupled with the field effect transistors 53, 54, and 55. The source of the field effect transistor 53 is coupled with the $V_{SS}$ rail 29, the source of the field effect transistor 55 is coupled with the $V_{DD}$ rail 27, and the field effect transistors 54, 55 are connected in series. The gate of the field effect transistor 54 is coupled with the $V_{SS}$ rail 29. The gate of field effect transistor 52 is coupled to the output from field effect transistors 53, 54, 55 to receive the logic signal Q. The gates of the field effect transistors 46, 48 and an input to the NOR gate 50 are also coupled with the output from the field effect transistors 53, 54, 55 to receive the voltage level Q.

The field effect transistors 53, 55 collectively function as an inverter, and field effect transistor 54 is persistently switched on because its gate is directly coupled with the $V_{SS}$ rail 29. The NOR gate 50 and the field effect transistors 53, 54, and 55 are connected in a feedback configuration to form a latch that is designed so that the logic signal Qbar will go to a logic 1 and the logic signal Q will initially go to a logic 0 during a power ramp on $V_{DD}$. The field effect transistor 54, which is persistently switched on, is added to increase the resistance of the pull-up network in the inverter and to force the circuit to latch with an initial state for the logic signal Q equal to logic 0. If one of the inputs of the NOR gate 50 goes high, indicating a properly functioning capacitor 26 or that an unpowered ESD event has occurred, the logic signal Qbar will switch to a logic 0 and the logic signal Q will switch to logic 1, and remain latched in that state for as long as $V_{DD}$ is powered or for the duration of the ESD event. The field effect transistors 53, 55 also form a simple memory element in addition to providing a logic function.

The field effect transistors 53, 54, 55 cooperate to output a logic signal Q that is equal to the complement of the logic signal Qbar output by the NOR gate 50. If the NOR gate 50 outputs a logic signal Qbar equal to logic 1, then the field effect transistor 53 is on and the field effect transistor 55 is off so that the logic signal Q is equal to logic 0. If the NOR gate 50 outputs a logic signal Qbar equal to logic 0, then the field effect transistor 53 is off and the field effect transistor 55 is on so that the logic signal Q is equal to logic 1.

If the field effect transistor 51 is turned on by the feedback from the node 28 between the resistor 24 and capacitor 26 to its gate, then the voltage at the node 62 between the field effect transistor 51 and resistor 56 is pulled up to $V_{DD}$. This high signal level representing logic 1 is fed through the inverter chain 59 to the NOR gate 50, which responds by outputting a logic signal Qbar equal to logic 0 (i.e., an analog voltage equal to $V_{SS}$). When the logic signal Qbar is equal to logic 0, the field effect transistor 55 is turned on, the field effect transistor 53 is turned off, and the voltage level of the logic signal Q is equal to logic 1 (i.e., $V_{DD}$). In this state, the transmission gate 44 passes a voltage appearing at the node 28 between the resistor 24 and capacitor 26 from its input 44a to its output 44b. in contrast, when the logic signal Qbar is equal to logic 1, then the field effect transistor 53 is turned on, the field effect transistor 55 is turned off, and the logic signal Q is equal to logic 0 (i.e., $V_{SS}$). In this state, the transmission gate 44 blocks the passage of a voltage level on node 28 from its input 44a to its output 44b so that the timing circuit 12 is deactivated and the power clamp device 22 is isolated from the timing circuit 12.

The control circuit 16 is configured to activate the transmission gate circuit 18 when an ESD event is detected or when the voltage of the timing circuit 12 rises above a predetermined value. The latching of the power clamp device 22 is sustained for the duration of ESD event so as long as the control circuit 16 is powered.

The ESD protection circuit 10 can be exposed to several different operating conditions with the capacitor 26 in the timing circuit 12 in a defective state or with the capacitor 26 in the timing circuit 12 in a functional state. If the capacitor 26 is not defective, the timing circuit 12 is activated and the transmission gate 44 transfers a voltage appearing on node 28 of the timing circuit 12 to the inverter chain 20. However, if the capacitor 26 is defective, then the timing circuit 12 is deactivated as a fail-safe mechanism and the transmission gate 44 blocks the transfer of a voltage appearing on node 28 of the timing circuit 12 to the inverter chain 20. Instead, the pull-up transistor 48 is activated to supply power from the $V_{DD}$ rail 27 to the input to the inverter 31 of the inverter chain 20, which turns off the power clamp device 22. As a result, the ESD protection circuit 10 is insensitive to defects in the capacitor 26 of the timing circuit 12.

The ESD protection circuit 10 has a set of operating conditions that are defined when the capacitor 26 in the timing circuit 12 is not defective and is instead functional.

One operating condition is present if the chip and the ESD protection circuit 10 are unpowered (i.e., $V_{DD}$ may be switched off or not connected), and the capacitor 26 in the timing circuit 12 is functional. Because the logic signal Qbar is equal to logic 0, the transmission gate 44 is turned on and the timing circuit 12 is connected to the inverter chain 20. A voltage characteristic of an ESD event appearing on node 28 is passed by the transmission gate 44 to the inverter chain 20. The inverter chain 20, in turn, drives the power clamp device 22, which switches on in order to dissipate the current from the ESD event on the $V_{DD}$ rail 27 to ground at the $V_{SS}$ rail 29. In this operating condition, the ESD protection circuit 10 functions identically to a standard RC clamp, and the timing circuit 12, which is activated, causes the power clamp device 22 to respond to an ESD event.

Another operating condition is present when the ESD protection circuit 10 and the chip are subjected to a normal power-up sequence with the capacitor 26 in the timing circuit 12 being functional. During the normal power-up sequence, the inverter chain 20 is initially cut off from the timing circuit 12 and the input 31a of the inverter 31 is pulled up to $V_{DD}$. If the voltage at the node 28 rises sufficiently high to indicate that the capacitor 26 is not defective, the timing circuit 12 is connected to the input 31a of the inverter 31. The specific value of the voltage on node 28 that causes the timing circuit 12 to be connected to the inverter chain 20 is determined by the design of the voltage divider presented by the field effect transistor 51 and resistor 56, and also by the design of the inverter chain 59 formed by inverters 58 and 60. The voltage divider formed by the field effect transistor 51 and resistor 56, as well as the inverter chain 59, are primarily responsible for determining when the voltage on the node 28 is sufficiently high to indicate that the capacitor 26 is not defective. As the voltage on node 28 rises, the gate voltage of the field effect transistor 51 also increases, thereby reducing the impedance of field effect transistor 51 and increasing the voltage at the node 62 between the field effect transistor 51 and resistor 56. Sufficiently high voltage at the node 62 causes the logic signal Qbar to transition to logic 0 and, as a result, the logic signal Q to transition to logic 1, which turns on the transmission gate 44 so that the voltage on node 28 is transferred from the input 44a of the transmission gate 44 to the input 31a of the inverter chain 20.

Another operating condition is present if the chip and the ESD protection circuit 10 are in a persistently powered state characteristic of normal powered operation, and the capacitor 26 in the timing circuit 12 is functional. If the capacitor 26 is not defective, then the node 28 between the resistor 24 and capacitor 26 is normally at $V_{DD}$ when the chip and the ESD protection circuit 10 are powered. The field effect transistor 51 is turned on by the feedback of logic 1 from node 28 to its gate, and the voltage at the node 62 between the field effect transistor 51 and resistor 56 is pulled up to $V_{DD}$, which is fed through the inverter chain 59 to the NOR gate 50 as a logic signal equal to logic 1. The NOR gate 50 responds by outputting logic 0 as the logic signal Qbar. When Qbar is equal to logic 0, the field effect transistor 55 is turned on, the field effect transistor 53 is turned off, and the logic signal Q is equal to logic 1. In this state, the transmission gate 44 passes a voltage from an ESD event appearing on the node 28 between the resistor 24 and capacitor 26 from its input 44a to its output 44b.

Because the timing circuit 12 of the ESD protection circuit 10 is activated and coupled with the inverter chain 20, the inverter chain 20 can drive the power clamp device 22 to trigger in response to an ESD event. The power clamp device 22 will be triggered for a duration determined by a time constant given by the product of the resistance of the resistor 24 and the capacitance of capacitor 26. Once triggered and latched, a current path provided in the power clamp device 22 directs the ESD current through the power clamp device 22 to the $V_{SS}$ rail 29, thereby clamping the $V_{DD}$ rail 27 to ground at the $V_{SS}$ rail 29.

If the capacitor 26 in the timing circuit 12 is defective, the ESD protection circuit 10 has a different set of operating conditions.

Because of normal yield considerations, the capacitor 26 in the timing circuit 12 may be fabricated in a defective condition in which the capacitor 26 exhibits an abnormally-low impedance (i.e., the capacitor 26 is shorted to ground). If the defective capacitor 26 is defective, then the timing circuit 12 is also defective.

Despite the capacitor 26 being in a defective condition, the timing circuit 12 will still trigger the power clamp device 22 during an ESD event with the chip unpowered. However, when the chip and ESD protection circuit 10 are powered and the capacitor 26 is in a defective condition, the ESD protection circuit 10 detects that the capacitor 26 is defective and disconnects the timing circuit 12 from the inverter chain 20. The deactivation of the timing circuit 12, as detailed hereinafter, arises from the logical control by the control circuit 16 over the transmission gate circuit 18. If the ESD protection circuit 10 did not isolate the timing circuit 12 from the power clamp device 22 when the chip is powered, the defective capacitor 26 would cause the node 28 to be pulled to ground and the timing circuit 12 to turn on the power clamp device 22 so that the $V_{DD}$ rail 27 is directly shorted to the $V_{SS}$ rail 29. The ESD protection circuit 10 averts this adverse occurrence by deactivating the timing circuit 12 when the chip is powered and thereby prevents the defective capacitor 26 from rendering the chip nonfunctional.

The voltage on the node 28 between the resistor 24 and capacitor 26 may be at, or near, $V_{SS}$ upon power up of the chip if the capacitor 26 is defective. However, the ESD protection circuit 10 may also be designed to interpret intermediate voltages and voltages near $V_{SS}$ on node 28 as reflecting that the capacitor 26 is defective, not just strictly voltages of $V_{SS}$ on node 28. Hence, the capacitor 26 does not have to exhibit a hard short to be considered defective, but may also be consider defective, for example, when the impedance of the capacitor 26 is on the order of the resistance of the resistor 24. One purpose of the voltage divider formed by field effect transistor 51 and resistor 56, and the inverter chain 59 formed by inverters 58 and 60, is to interpret non-zero voltages on node 28 as an indication that the capacitor 26 is defective. Defective and non-defective voltages on node 28 are discriminated based upon the design of the field effect transistor 51, the resistor 56, and the inverter chain 59.

The voltage on node 28 indicating that the capacitor 26 is defective is fed back to the gate of the field effect transistor 51 and turns off the field effect transistor 51. With the field effect transistor 51 turned off, the voltage at the node 62 between field effect transistor 51 and resistor 56 is equal to $V_{SS}$, which is fed as a logic signal of logic 0 to an input of the NOR gate 50. Upon power up, the ESD detection circuit 14 persistently outputs a voltage level equal to a logic signal of logic 0 that is input to the NOR gate 50. As a result, each of the inputs to the NOR gate 50 receives a logic signal of logic 0, which causes the NOR gate 50 to output a value of logic 1 for the logical signal Qbar and the field effect transistors 53, 54, 55 to output a value of logic 1 for the logical signal Q that is complementary to the logical signal Qbar. When the logic signal Qbar transitions to logic 1 and the logic signal Q contemporaneously transitions to logic 0, the transmission gate 44 is turned off and the field effect transistor 48 is turned on. Turning off the transmission gate 44 electrically isolates the timing circuit 12 from the power clamp device 22 and thereby deactivates the timing circuit 12. Turning on field effect transistor 48 supplies $V_{DD}$ to the inverter chain 20, which pulls up the input 3 1a to inverter 31. An analog voltage of $V_{DD}$ is routed to the inverter chain 20, which powers the gate of the power clamp device 22 so that the power clamp device 22 is turned off.

It will be understood that when an element is described as being "connected" or "coupled" to or with another element, it can be directly connected or coupled to the other element or, instead, one or more intervening elements may be present. In contrast, when an element is described as being "directly connected" or "directly coupled" to or with another element, there are no intervening elements present. When an element is described as being "indirectly connected" or "indirectly coupled" to or with another element, there is at least one intervening element present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A protection circuit comprising:
   a power clamp device;
   a timing circuit including a resistor and a capacitor that is coupled with the resistor at a node;
   a transmission gate configured to selectively connect the node of the timing circuit with the power clamp device; and
   a control circuit coupled with the node, the control circuit configured to control the transmission gate based at least in part upon whether or not the capacitor is defective.

2. The protection circuit of claim 1 wherein the control circuit is configured to output a first set of logic signals that turn off the transmission gate so that the timing circuit is not connected to the power clamp device and a second set of logic signals that turns on the transmission gate so that the timing circuit is connected to the power clamp device, the first set of logic signals being output to the transmission gate if the capacitor is defective, and the second set of logic signals being output to the transmission gate if the capacitor is not defective.

3. The protection circuit of claim 2 further comprising:
   a field effect transistor coupled between a positive power supply rail and the power clamp device, the field effect transistor configured to be operated by the control circuit to transfer power from the positive power supply rail to the power clamp device when the first set of logic signals is output to the transmission gate.

4. The protection circuit of claim 3 further comprising:
   an inverter chain coupling the field effect transistor and the transmission gate with the power clamp device.

5. The protection circuit of claim 4 wherein the power clamp device is a field effect transistor.

6. The protection circuit of claim 1 wherein the control circuit includes a NOR gate coupled with the node at which the capacitor is coupled with the resistor.

7. The protection circuit of claim 6 wherein the control circuit includes a first field effect transistor including a gate coupled with the node, a drain coupled with a positive power supply rail, and a source, and the NOR gate includes a first input coupled with the source of the first field effect transistor.

8. The protection circuit of claim 7 further comprising:
a detection circuit configured to sense occurrence of an electrostatic discharge event,
wherein the NOR gate includes a second input coupled with the detection circuit.

9. The protection circuit of claim 7 wherein the NOR gate includes an output and is configured to output a first logic level at the output, and further comprising:
an inverter having an input coupled with the output from the NOR gate and an output, the inverter configured to provide a second logic lever complementary to the first logic level; and
a second field effect transistor coupled between a positive power supply rail and the power clamp device, the second field effect transistor having a gate coupled with the output of the inverter.

10. The protection circuit of claim 9 wherein the NOR gate includes a second input coupled with the output from the inverter.

11. The protection circuit of claim 1 wherein the capacitor is a deep trench decoupling capacitor.

12. The protection circuit of claim 11 wherein the power clamp device is a field effect transistor.

13. A method of operating a protection circuit that includes a timing circuit, a power clamp device, and a transmission gate having an input coupled with the timing circuit and an output coupled with the power clamp device, the method comprising:
powering a chip associated with the protection circuit;
when the chip is powered, detecting whether a capacitor of the timing circuit is defective; and
in response to detecting that the capacitor is defective, deactivating the timing circuit by placing the transmission gate in a high impedance state to isolate the timing circuit from the power clamp device.

14. The method of claim 13 comprising:
in response to detecting that the capacitor of the timing circuit is not defective, activating the timing circuit such that the timing circuit can trigger the power clamp device in response to an electrostatic discharge event.

15. The method of claim 13 further comprising:
turning off the power clamp device so that the protection circuit does not respond to an electrostatic discharge event occurring on a positive power supply rail.

16. The method of claim 15 wherein the power clamp device is a field effect transistor with a drain connected to the positive power supply rail and a source connected to a negative power supply rail, and turning off the power clamp device comprises:
powering a gate of the field effect transistor with a pull-up transistor so that the field effect transistor is switched off.

17. The method of claim 13 wherein deactivating the timing circuit comprises:
supplying a first logic signal from a NOR gate to a first field effect transistor of the transmission gate;
generating a second logic signal that is complementary to the first logic signal with an inverter coupled with the NOR gate; and
supplying the second logic signal to a second field effect transistor of the transmission gate,
wherein the first and second logic signals are selected to place the transmission gate in the high impedance state if the capacitor of the timing circuit is defective.

18. The method of claim 13 further comprising:
in response to detecting that the capacitor of the timing circuit is not defective, coupling the input of the transmission gate with the output of the transmission gate to activate the timing circuit for triggering the power clamp device in response to an electrostatic discharge event.

19. The method of claim 13 wherein the capacitor is a deep trench decoupling capacitor.

20. The method of claim 13 wherein deactivating the timing circuit comprises:
in response to detecting that the capacitor of the timing circuit is defective, outputting a set of logic signals from a control circuit to the transmission gate that turns off the transmission gate so that the timing circuit is not connected to the power clamp device.

* * * * *